No. 641,304. Patented Jan. 16, 1900.
G. LANZENDOERFER.
PROTECTIVE LINING FOR VESSELS.
(Application filed Aug. 26, 1899.)
(No Model.)
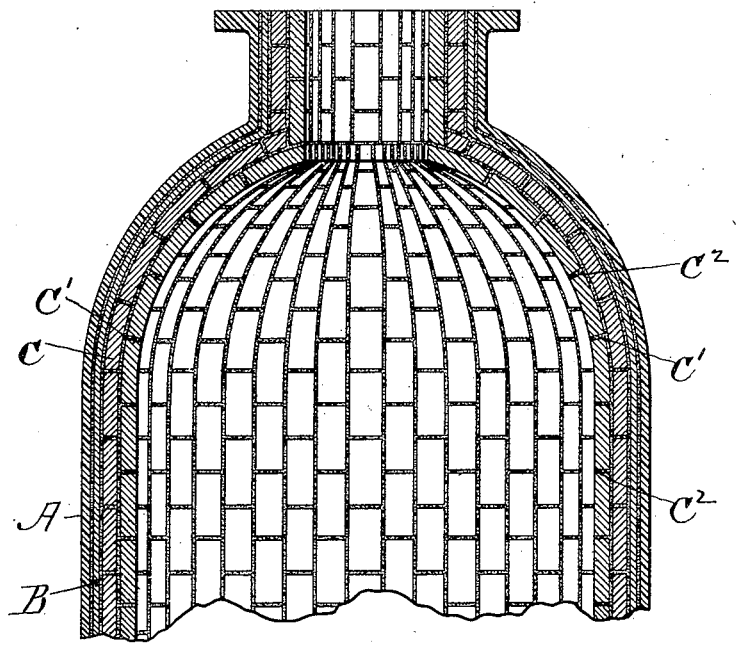
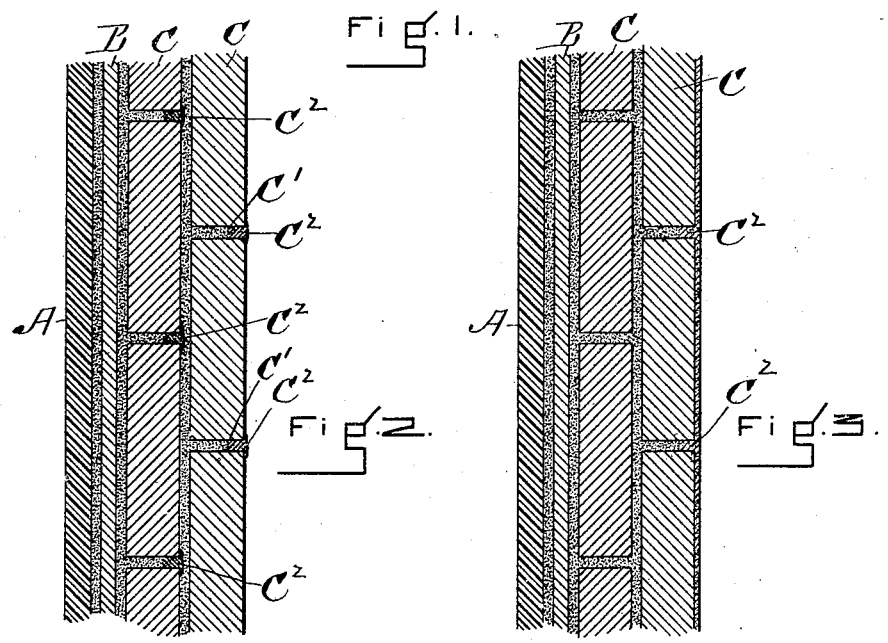
WITNESSES:
J. M. Dolan.
H. T. Butler.
INVENTOR:
Geo. Lanzendoerfer
by his atty
Clark & Raymond
THE NORRIS PETERS CO., PHOTO-LITHO., WASHINGTON, D. C.

and other disintegrating means from the in-
UNITED STATES PATENT OFFICE.

GEORGE LANZENDOERFER, OF BOSTON, MASSACHUSETTS, ASSIGNOR OF ONE-THIRD TO JEREMIAH C. SPILLANE, OF SAME PLACE.

PROTECTIVE LINING FOR VESSELS.

SPECIFICATION forming part of Letters Patent No. 641,304, dated January 16, 1900.

Application filed August 26, 1899. Serial No. 728,542. (No model.)

*To all whom it may concern:*

Be it known that I, GEORGE LANZENDOER-FER, a citizen of the United States, residing at Boston, in the county of Suffolk and State of Massachusetts, have invented a new and useful Improvement in Protective Linings for the Inner Walls of Metal and other Vessels, of which the following is a full, clear, and exact description, reference being had to the accompanying drawings, forming a part of this specification, in explaining its nature.

The invention relates to a protective lining for metal and other vessels which is designed to resist the passage of acids, steam, heat, and other disintegrating means from the interior of the vessel to the exterior inclosing wall or shell of the vessel.

I have illustrated the invention as applied to digesters, but do not wish to be understood as limiting it to this class of vessel.

The invention consists in using for the lining of the shell of the vessel a non-heat-conducting material having an earthy or stony base, preferably in the shape of molded forms, like bricks, and which may be ordinary burned bricks, either rectangular or of any other similar shape, of an earthy or stony composition. Ordinary burned bricks will answer for some uses, other uses will require burned pressed bricks, and still others burned bricks with enameled faces, the density and finish of the brick or pieces of lining depending to some extent upon the amount of pressure within the vessel and to the character of the contents thereof. The bricks are laid in as many courses as may be desired (one will answer) and preferably to break joints, although not necessarily so, and in a cement which upon being subjected to heat becomes non-absorbent, impervious, fluid-tight, and is not attacked or disintegrated by the action of chemical solutions. Where the lining is subjected to large differences in temperature, it is desirable that such cement shall also have substantially the same range of expansion and contraction as that of the lining. For use in connection with a lining of burned pressed bricks, either with or without enameled faces, I prefer to embed the bricks in a cement made of silicate of soda, litharge, lime or chalk, and china-clay in about the following proportions: fifty to seventy-five per cent. of silicate of soda, fifteen to thirty-five per cent. of litharge, ten to twenty-five per cent. of lime or chalk, fifteen to thirty-five per cent. of china-clay. These ingredients are ground and mixed with sufficient water to make them plastic, and the composition is used in laying the bricks in the usual manner. The exposed edges of the layers of cement between the bricks are then subjected, in the case of the cement in question, to intense heat by an electric welding apparatus or in any other desired manner, whereby the cement is caused to be transformed into a vitreous body which unites with the edges of the brick on each side by a mechanical and supposed chemical union and which connects the bricks by a vitreous or enameled connection and at the same time seals the joints between them and covers the cement, which remains unchanged, this vitreous or enameled union serving to make the joints between the bricks fluid, steam, and acid proof, forming an impervious covering or packing thereto.

In the drawings, Figure 1 is a view in vertical section of a portion of a digester equipped with my invention. Figs. 2 and 3 are enlarged detail views in section, to which reference will hereinafter be made.

Referring to the drawings, A is the outer steel shell of a digester. B is the layer of lead commonly used in connection with the steel shell. C is the non-heat-conducting lining, of brick or similar material, C' the joints therein, and C² the vitreous sections of said joints.

While I have shown the invention as applied to the lining of a digester, I do not wish to be understood as limiting it to such use, but may use it for the lining of any vessel the wall or shell of which it is desired to protect from the action of the contents of the vessel. Neither would I confine myself to the special form of cement which I have referred to, as any cement capable of forming a glaze or being vitrified into a homogeneous impervious joint-sealing and brick-connecting medium may be used.

While I have described the bricks as entirely laid in a cement capable of vitrifaction by heat, I would say that it is not essential that the entire body of the cement be of this character, but only so much thereof as shall require to be transformed in the act of making a homogeneous impervious joint and connection.

Where the lining consists of two or more courses of brick, the interior joints may be made with a cement capable of vitrifaction and the joints vitrified as above described, and in this manner the increased protection of the vitrified inner line of joints is obtained. The invention may be practiced also by applying the vitreous cement to the exposed edges of joints made of hydraulic or other cement and then vitrifying the cement, or portions of the other or common cement may be removed from the joints and the interstices thus made filled with the vitreous cement, which is then vitrified. These last-named methods are especially suited for applying the invention to brick linings now in use in digesters and other vessels.

When a sealing of vitreous enamel is desired, the enamel composition is applied to the joint in any desired way and vitrified in place by heat, as above described, or the enamel composition may be made in the form of sticks and applied to the joint under heat, much as solder is applied by a soldering-iron.

In Fig. 2 I have shown the joints of the inner course of brick sealed by vitrified cement or enamel in addition to the joints of the outer course.

Having thus fully described my invention, I claim and desire to secure by Letters Patent of the United States—

1. The protective lining to the wall of metal and other vessels comprising a surface or body of brick or other earthy or stony non-heat-conducting material, the joints of which are closed to any desired extent with a homogeneous, vitreous body uniting and combining with the edges of the brick, as and for the purposes set forth.

2. A lining for vessels comprising blocks of brick or stone or other earthy or stony non-heat-conducting material laid in whole or in part in a cement capable of vitrifaction, and which cement or portions thereof is vitrified by heat after the bricks and cement have been laid, caused during vitrifaction to unite with the edges of the brick, and furnishing an impervious, homogeneous joint between the bricks, as and for the purposes set forth.

GEORGE LANZENDOERFER.

Witnesses:
F. F. RAYMOND, 2d,
J. M. DOLAN.